(12) United States Patent
Voute et al.

(10) Patent No.: US 6,613,234 B2
(45) Date of Patent: Sep. 2, 2003

(54) LARGE PORE VOLUME COMPOSITE MINERAL OXIDE BEADS, THEIR PREPARATION AND THEIR APPLICATIONS FOR ADSORPTION AND CHROMATOGRAPHY

(75) Inventors: Nicolas Voute, Maurecourt (FR); Egisto Boschetti, Croissy sur Seine (FR); Pierre Girot, Paris (FR); Marc Perez, Saint Egreve (FR); Jean-Claude Viguie, Herbeys (FR)

(73) Assignee: Ciphergen Biosystems, Inc., Fremont, CA (US)

( * ) Notice: Subject to any disclaimer, the term of this patent is extended or adjusted under 35 U.S.C. 154(b) by 210 days.

(21) Appl. No.: 09/274,013

(22) Filed: Mar. 22, 1999

(65) Prior Publication Data

US 2002/0005383 A1 Jan. 17, 2002

Related U.S. Application Data

(60) Provisional application No. 60/080,838, filed on Apr. 6, 1998.

(51) Int. Cl.⁷ ............................................. B01D 15/08
(52) U.S. Cl. .................... 210/656; 210/198.2; 502/400; 502/402; 502/404
(58) Field of Search ......................... 210/198.2, 502.1, 210/509, 635, 656; 502/402, 404, 400, 401, 403

(56) References Cited

U.S. PATENT DOCUMENTS

| | | | |
|---|---|---|---|
| 4,600,646 A | 7/1986 | Stout | ........................... 428/405 |
| 4,648,975 A | 3/1987 | Barkatt et al. | ............... 210/656 |
| 4,673,734 A | 6/1987 | Tayot et al. | ................. 530/364 |
| 5,015,373 A | 5/1991 | Carr et al. | ................ 210/198.2 |
| 5,128,291 A | 7/1992 | Wax et al. | ....................... 502/8 |
| 5,182,016 A | * 1/1993 | Funkenbusch et al. | |
| 5,205,929 A | 4/1993 | Carr et al. | ................ 210/198.2 |
| 5,268,097 A | 12/1993 | Girot et al. | ............... 210/198.2 |
| 5,271,833 A | 12/1993 | Funkenbusch et al. | ... 210/198.2 |

OTHER PUBLICATIONS

CRC Handbook of Chemistry and Physics, 59ᵗʰ Edition, 1979, pp. B–90 and B–120.*
Shalliker, R. et al.; "Controlling the Pore Structure of Zirconia for Chromatographic Applications"; *J. Liq. Chrom. & Rel. Technol.*, vol. 20(11): pp 1651–1666 (1997).

Horvath, J. et al.; "High–Performance Protein Separations with Novel Strong Ion Exchangers"; *Journal of Chromatography A*, vol. 679: pp 11–22 (1994).

Boschetti, E.; "Advanced Sorbents for Preparative Protein Separation Purposes"; *Journal of Chromatography A*, vol. 658: pp 207–236 (1994).

Koller, A.; "Structure and Properties of Ceramics"; *Materials Science Monographs*, vol. 80: pp 130–133 (1994).

Nawrocki, J. et al.; "Chemistry of Zirconia and its Use in Chromatography"; *Journal of Chromatography A*, vol. 657(2): pp 229–282 (1993).

Mohan, S. et al.; "Silica–Based Phases for Affinity Chromatography: Effect of Pore Size and Ligand Location upon Biochemical Productivity"; *Biotechnology and Bioengineering*, vol. 40: pp 549–563 (1992).

Nelson, T. et al.; "Attrition in a Liquid Fluidized Bed Bioreactor"; *Ind. Eng. Chem. Res.*; vol. 27: pp 1502–1505 (1988).

Kopaciewicz, W. et al.; "Influence of Pore and Particle Size on the Frontal Uptake of Proteins"; *Journal of Chromatography*, vol. 409: pp 111–124 (1987).

Unger, K.; "Porous Silica Its Properties and Use as Support in Column Liquid Chromatography"; *Journal of Chromatography Library*, vol. 16: pp. 49–55 and 194–195 (1979).

* cited by examiner

*Primary Examiner*—W. L. Walker
*Assistant Examiner*—David Sorkin
(74) *Attorney, Agent, or Firm*—Foley & Lardner

(57) ABSTRACT

The present invention provides porous mineral oxide beads which have large pore volumes and enhanced stability. The beads are based on a tetravalent metal oxide, such as zirconia, titania or hafnia. These highly porous beads are produced from a mixture of tetravalent mineral oxides, mineral pore inducing agents which are oxides or salts of trivalent metals, and optional binders. The porous mineral beads can be filled with a polymer gel and used for adsorption and chromatography applications.

61 Claims, No Drawings

LARGE PORE VOLUME COMPOSITE MINERAL OXIDE BEADS, THEIR PREPARATION AND THEIR APPLICATIONS FOR ADSORPTION AND CHROMATOGRAPHY

This application claims the benefit of Provisional Application No. 60/080,838, filed Apr. 6, 1998.

1. FIELD OF THE INVENTION

The present invention relates to beads which are useful as packed bed and fluidized bed support materials for adsorption and chromatography, and methods of making these support materials.

2. BACKGROUND OF THE INVENTION

Modern preparative and analytical solid phase adsorption and chromatography techniques call for improved stationary phases exhibiting high selectivity, large capacity, high mechanical resistance, and high chemical compatibility. These properties, defined by the characteristics of the solid matrix, have evolved with the development of adsorbent media, from soft organic material to semi rigid packing and then to rigid mineral solid phases.

Large capacity, and the ability to control pore size as well as chemical functionalization, has led to the development of many types of soft organic sorbents, based on polysaccharides (dextran, agarose, cellulose) or on weakly crosslinked synthetic materials (dilute polyacrylates, dilute polymethacrylates, dilute polyacrylamide derivatives). These materials have been employed in many applications, such as ion-exchange, gel filtration, and affinity chromatography, but they have always suffered from limited mechanical stability unfavorable for utilization at large scale or high velocity.

Additionally, when mixed in solvents (e.g. 95% ethanol) or in high salt concentration solutions, or when submitted to moderate temperatures (e.g. 35–50° C.) or to mechanical stresses (e.g. pressures of 1.5–3 bar), the properties of these soft organic adsorbents are altered such that their specificity or the efficacy of the separation is reduced or even lost. These undesirable mechanical and functional modifications include pore size reduction, network shrinkage, alteration of bead sphericity and chemical degradation. Additionally, the low density of soft organic polymers makes it difficult to use them in situations where the solid phase must be separated from the liquid phase. This is particularly the case for stirred tank solid phase adsorption, in which the beads must be collected by sedimentation. These organic particles are also difficult to handle in fluid and expanded beds due to the low density difference between the beads and the liquid in which they are suspended.

Semi-rigid organic materials, such as synthetic organic polymers (e.g. crosslinked polyacrylamide derivatives, crosslinked polystyrene, or crosslinked polystyrene-divinylbenzene copolymers) as well as crosslinked natural polymers (e.g. crosslinked agarose) have also been used as sorbents for liquid chromatographic applications. These polymers possess improved mechanical resistance over soft hydrophilic organic materials, but their use is restricted to the low to medium pressure range, which is prejudicial to maximum process velocity and bed height. Operating at high velocity is often advantageous to improve the column productivity or, in some instances, to reduce the processing time of labile molecule. Semi-rigid packing materials subjected to a low or medium hydrostatic pressure can be deformed to such an extent that the packed bed interstitial volume is contracted. This reduction in the bed permeability induces a further increase in the pressure drop, followed by clogging of the column.

Similarly, the low density differential between the aqueous solutions usually used in liquid chromatography and organic polymer based chromatographic media precludes their use for fluidized bed applications. In fluidized bed applications, upward liquid speeds for a given bed expansion depend on particle density and particle diameter. There is little benefit to compensating for low density by increasing the particle diameter, because there is a concomitant increase in the characteristic diffusion length within the bead that constrains the mass transfer efficiency, and hence the productivity of the media.

Therefore, there is a need to provide relatively small porous particles which retain their shape, their chemical and mechanical properties in specific environments useful for biomolecule separation in column as well as in suspension, and which offer a substantial density difference with liquids used in adsorption and chromatography.

To circumvent the compressibility and related drawbacks of organic materials, mineral based sorbents have been developed. These sorbents are based on porous mineral materials, on the surface of which chemical functions are grafted for chromatographic application. Porous silica material, the most popular mineral chromatographic solid phase, is relatively easily modified to a desired surface area, pore volume and pore size.

The binding capacity of conventional mineral grafted silica is directly related to the internal surface area available for chemical modification. The trend, therefore, has been to select high specific surface area material to obtain the highest chemical grafting ratio (see, Unger, K., *Porous Silica,* Elsevier, Amsterdam-Oxford-New York (1979)). However, due to the inverse relationship between specific surface area and pore diameter, a compromise between pore size and specific surface area must be reached, especially for large solute adsorption applications. A silica with a large surface area yields a low pore diameter, which hinders or even prevents the diffusion of large solutes into the pores and causes incomplete surface utilization for binding (Mohan, S. et al., *Biotechnology and Bioengineering,* 40, 549–563 (1992)). On the other hand, a silica bead having a pore diameter large enough for unhindered large molecule diffusion possesses a reduced surface area and therefore a low grafting ratio and a low binding capacity (Kopaciewicz, W. et al., *Journal of Chromatography,* 409, 111–124 (1987)).

To solve the specific problem related to the separation of large molecules, particularly proteins and nucleic acids, silicas with the pore volume filled by weakly crosslinked natural and synthetic hydrogels have been described (U.S. Pat. Nos. 4,673,734 and 5,268,097). With such media, large pore silica with low surface area is converted to a high capacity media by intraparticle polymerization of functionalized monomers and a crosslinking agent or by introducing polysaccharides that are crosslinked in place. It has been demonstrated that the sorptive capacity of this type of packing material is only dependent on the mineral matrix pore volume. Unlike surface grafted or polymer coated silica, the surface area of this media does not impact directly the binding capacity. The sorptive capacity is a function only of the amount of hydrogel present within the pores, and therefore the pore volume plays a primary role. The bead porosity must therefore be as large as possible, to increase the volume of the hydrogel on which the sorption of macromolecules occurs. However, like classical silica based material, a diminution of capacity is observed for low pore diameter matrixes, due to steric hindrance for large molecular weight solutes, which are unable to access the totality of the gel filled pore volume. For example, U.S. Pat. No. 5,268,097 discloses that at a constant pore volume of 1 mL/g, a 40% decrease in bovine serum albumin binding capacity was observed when the pore diameter was reduced from 3000 to 300 Å.

In this composite stationary phase, the rigid skeleton provides mechanical strength enabling operation at high flow rates without compression, while the soft gel provides the adsorption sites. This approach has been successful in providing a variety of large protein binding capacity media, he functionality of which depend on the hydrogel composition (Boschetti, E., *Journal of Chromatography A*, 658, 207–236 (1994); Horvath, J. et al., *Journal of Chromatography A*, 679, 11–22 (1994)). However, silica shows a high sensitivity to alkaline conditions that precludes its utilization in applications requiring the use of a base. However, basic conditions are required for the large majority of biomolecule separation processes, as they require an alkaline pH treatment either for compound elution, or for sorbent cleaning. As a result, the use of silica-based media is problematic in such processes.

The sensitivity of silica-based media to alkaline conditions can be avoided to some extent by the use of large pore diameter media. With a large pore diameter, and therefore a low surface area, the sensitivity of silica material to caustic solutions is reduced, since the sensitivity is a surface-area dependent phenomenon. Hydrothermal treatment is a classical means to increase the average pore diameter of silica materials and concurrently to reduce the specific surface area (Unger, 1979). However, additional improvements are necessary to enhance the silica stability to repetitive alkaline treatments.

Many attempts have been made to increase the pH stability of silica packing. For example, U.S. Pat. Nos. 4,648,975 and 4,600,646 describe methods for cladding a porous silica with an alkali-stable metal oxide layer. Although these treatments contribute to an enhancement of the alkaline stability of silica based material, they are still insufficient with regard to packing length life and contamination of column effluent by leachable silicate.

More recent work has attempted to produce alkaline stable porous mineral oxide based media, such as titania (titanium dioxide) or zirconia (zirconium dioxide), that would advantageously replace porous silica as a solid matrix, due to their chemical inertness in both low and high pH environments. However, none of these porous materials, as of today, possess physical characteristics compatible with the hydrogel-filled porous packing concept.

For example, U.S. Pat. Nos. 5,015,373 and 5,271,833 describe spherical beads of zirconia stable in about pH 14 solutions. These beads are obtained, for example, by a sol-gel method that consists of emulsifying an aqueous colloidal zirconia sol in a water immiscible liquid. The liquid is chosen so that it extracts the water from the pellets to form gelled spherules. After gelification, the spherules are hardened by calcination at temperature ranging from 400 to 900° C. The mineral oxide is then coated with a hydrophobic polymer, such as polybutadiene.

The zirconia particles produced with this process have a relatively large surface area, a low mean pore diameter and a medium porosity, as described in U.S. Pat. No. 5,015,373. Increasing the firing temperature from 400 to 900° C. decreases the surface area from 142 to 14 m$^2$/g, increases the pore diameter from to 40 to 220 Å, and decreases the internal porosity from about 50 to 30% of the total bead volume.

After functionalization with polymers, these media are adequate only for small size molecule purification. They would not be adequate as substrates for a polymer filled based packing approach, due to their low porosity and small pore dimension. Hindered intraparticle diffusion of macromolecules such as typical biomolecules is expected with such material.

Pore size larger than about 500 Å are required for unhindered protein diffusion in gel filled pore packing. Moreover, the firing process, described in the aforementioned patents, contributes only slightly to the increase of the pore diameter and to the detriment of the bead porosity. Consequently, binding capacities of gel filled beads based on this process would reach only modest values, due to steric hindrance (low pore diameter) and reduced pore volume.

In addition, mineral oxide surfaces exhibit various types of interactions with proteins (electrostatic, van der Waals, Lewis acid-base), that can alter the quality of a separation or even denature the biomolecule. Therefore these activities must be suppressed or masked when dealing with grafted or polymer coated phases. Thus, there are definite advantages in utilizing a low specific surface area mineral oxide in order to minimize non-specific interactions that reduce the specificity of the purification.

U.S. Pat. No. 5,128,291 describes the production of zirconia or titania particles by spray-drying a slurry of zirconia or titania powder to which a soluble compound of a metal (called the binder), such as titanium or zirconium nitrate or sulfate, is added. This soluble compound decomposes during the spray-drying phase and cements the sub-particles.

The initial diameter of elemental particles (called ultimate particles in the U.S. Pat. No. 5,128,291) used for the preparation of the final porous beads determines the final size of the pores. U.S. Pat. No. 5,128,291 indicates that the larger the ultimate particles, the larger the pore diameter. Examples 1 and 2 report that beads obtained by spray-drying followed by a 500° C. calcination show a pore diameter of about 2000 Å, a specific surface area of about 18 m$^2$/g and a porosity of about 45%, using ultimate particles of 2000 Å.

In other words, stronger bonds between the elemental particles may be achieved by using higher sintering temperatures (Nelson, T. et al., *Ind. Eng. Chem. Res.*, 27, 1502–1505 (1988)). While the increase in the sintering temperature will in fact cement more tightly the particles, it will be prejudicial for the porosity. High temperature sintering of such a conglomerate of elemental particles will give lower pore volume as a result of a volume collapse related to the melting phenomena between subparticles.

It is also well known that treatment of some mineral oxides at high temperatures is responsible for crystallographic changes which may adversely impact the mechanical stability of the final product.

For example, zirconia may exist at room temperature in an amorphous form as well as any of three crystallographic forms: monoclinic, tetragonal and cubic. The cubic form is the highest energy form and is thermodynamically less stable than the two other forms at room temperature. The monoclinic form is the most stable conformation at room temperature. On cooling across the transformation temperature, from the tetragonal to the monoclinic phase, the volume of zirconia grains increases by 3 to 5%. This change in volume produces strains in the matrix that are responsible for the development of cracks. These structural defects are critical for the product stability (Koller, A., *Structure and Properties of Ceramics,* Elsevier, Amsterdam, London, New York, Tokyo (1994)).

The strength of mineral oxide matrixes produced as described in U.S. Pat. No. 5,128,291 cannot be reinforced by a higher sintering treatment due to the deleterious effect of phase transformations combined with a pore volume shrinkage. Both effects would prohibit the use of such materials in processes requiring high attrition resistance or high binding capacity.

Additionally, the use of binders, such as zirconium sulfate, has been criticized (Nawrocki, J. et al., *Journal of Chromatography A,* 657, 229–282 (1993)) because sulfates may not be removed by the relatively low calcination temperature suggested in U.S. Pat. No. 5,128,291, and may produce very acidic sites on the surface of final particles that may interfere with the quality of the chromatographic separation.

As a means to reduce the effect of high temperature on pore volume reduction, sodium chloride has been described as an additive prior to the sintering of porous silica (Unger, 1979). This technique consists of filling the porosity with a high-temperature-melting salt, such as sodium chloride, and calcining at a temperature below the melting point of the salt. This process results in an increase in mean pore diameter, by melting the narrower pores of silica, with only a slight decrease in the pore volume. This methodology has been recently applied to low pore diameter zirconia beads (Shalliker, R. et al., *J. Liq. Chrom. & Rel. Technol.,* 20(11), 1651–1666 (1997)), allowing the production of about 400 Å beads. However, this controlled sintering process is difficult to operate, and requires prohibitive washing with water and solvent to eliminate the salt entrapped in the porosity which is, moreover, lost.

3. SUMMARY OF THE INVENTION

The present invention relates to new mineral oxide beads exhibiting superior chemical stability at any pH together with high porosity, low surface area, high mean pore diameter, high mechanical stability and attrition resistance. The beads are suited for transformation into polymer-filled pore-based sorbents. Moreover, they show a high density that facilitates the packing of fixed-bed columns, increases the particle sedimentation velocity in batch, and permits the use of high velocity in fluidized-bed operations.

Specifically, the present invention encompasses mineral oxide beads of a tetravalent metal such as zirconia, hafnia or titania, which have a pore volume which exceeds 40% of the bead volume. The invention also encompasses the mineral oxide beads which have pores filled with a hydrogel polymer.

The present invention also relates to a new method of increasing the pore volume of mineral oxides by the use of mineral pore inducers. When the resulting materials are fired at high temperature to sinter the mineral architecture, the presence of mineral pore inducers also stabilizes a crystallographic form to prevent any grain growth and concomitant cracks due to crystallographic phase transformation. As a result of the high sintering temperature and absence of crystallographic phase transformation, particles with high mechanical stability and attrition resistance are obtained, while preserving a high pore volume. This is accomplished by a process in which beads are formed from a mixture of a mineral oxide of a tetravalent metal, a macropore inducing agent and optional binders. The macropore inducing agent is an oxide or a salt of a trivalent metal such as aluminum, gallium, indium, scandium, yttrium, lanthanum, actinium, or a rare earth metal.

The present invention additionally encompasses the use of the novel mineral oxide beads described herein in solid phase adsorption and in chromatographic applications.

4. DETAILED DESCRIPTION

The present invention provides novel compositions of mineral oxide porous particles as well as methods to produce and use the compositions. The compositions of the present invention can be small discrete beaded particles as well as irregular shaped particles, showing high pore volume and high mechanical and chemical stability. Because of their stability and high porosity, they are particularly useful in packed bed, fluidized bed or stirred batch adsorption or chromatographic separation for large macromolecules. In particular these particles are suitable for transformation into gel-filled pore-packing sorbents.

The present invention utilizes a surprising and useful property found when preparing aqueous suspensions of metal oxide microparticles, such as zirconia, titania and hafnia, mixed with salts or oxides of other elements that possess a different valence, such as rare earth salts or aluminum salt. For example, mixing zirconium oxide ($ZrO_2$) with yttrium oxide ($Y_2O_3$) or with yttrium nitrate $Y(NO_3)_3$ results in the formation of a viscous suspension which is used to make a macroporous material by agglomeration. It was unexpectedly discovered that the resulting materials exhibit a significantly higher porosity and mean pore diameter than materials composed of zirconium oxide alone. Moreover, the macroporosity was found to be proportional to the amount of the macropore inducing mineral agent introduced in the initial suspension.

Although it is not well understood why, combinations of tetravalent metal oxides, such as titanium oxide ($TiO_2$), zirconium oxide ($ZrO_2$) and hafnium oxide ($HfO_2$), with trivalent metal salts and oxides, results in the formation of unstable suspensions which, after agglomeration to form spherical or irregular particles, show macroporosity and large pore sizes. This porosity and macropore size is greater than that obtained in the absence of such mineral macropore inducers.

The mineral oxide is an oxide of a tetravalent metal, preferably titanium, zirconium or hafnium. The mineral oxide can also be a mixture of two or more such tetravalent metal oxides. Preferably, the mineral oxides are in the form of a powder, and most preferably a powder with a particle size of 0.1 to 10 $\mu$m.

The trivalent metal can be used in the form of an oxide, a salt, or mixtures of oxide and salt. A particularly preferred salt is nitrate. The metal can be any metal which exhibits a +3 valence, such as, group IIIB metals, rare earth metals, and the like. Preferred trivalent metals are aluminum, gallium, indium, scandium, yttrium, lanthanum, cerium, neodymium, erbium, ytterbium, and actinium.

Also included within the scope of the present inventions are compositions in which the trivalent metal oxide or salt is a mixture of two or more such oxides or salts. The terms "macropore inducers", "pore inducers" or "pore inducing mineral agent" as used herein refer to trivalent metal oxides or trivalent metal salts, as well as mixtures of two or more such trivalent metal oxides or trivalent metal salts. Such mixtures include salt/oxide mixtures, salt/salt mixtures and oxide/oxide mixtures of the same or different trivalent metals.

We have also discovered that the presence of mineral pore inducers also results in the unexpected and interesting property that only a limited pore volume reduction is observed when firing the compositions at very high temperatures. In contrast, metal oxide beads obtained without the benefit of the use of the pore inducers of the present invention yield low pore volumes when fired at very high temperatures, due to a severe reduction of pore volume resulting from the firing process.

Additionally, mineral pore inducers can be chosen so that they stabilize a crystalline form of the mineral oxide and avoid grain growth and cracking of the final material.

Optionally and preferably, an agent that induces particle agglomeration to make a beaded final material, such as an agglomeration promoting material or a binder may be included. The agglomeration promoting materials or binders can be salts of trivalent or tetravalent metals, and can contain the same tetravalent or trivalent metals used as the mineral oxide bead constituent or the pore inducing agent, or a different trivalent or tetravalent metal. In a preferred embodiment, the binder comprises a mixture of nitrates, including a tetravalent metal nitrate and a trivalent metal nitrate. For example, when zirconium oxide is used as a mineral oxide bead constituent and cerium oxide is used as a pore inducing agent, it is convenient to use a mixture of zirconium nitrate and cerium nitrate as a binder. Other suitable binders include materials which form mineral hydrogels that can encapsulate mineral oxide elemental particles, for example silica gels. A mineral hydrogel may also be used in combination with one or more additional binders.

The mineral composite oxides of the present invention are good porous materials for the preparation of sorbents used in solid phase adsorption and chromatography. They can, for instance, be filled with soluble polymers that are crosslinked in place as described in U.S. Pat. No. 4,673,734, or filled with monomers that can be copolymerized in place as described in U.S. Pat. No. 5,268,097.

According to the present invention, composite mineral oxides with enhanced pore volume are made by preparing a liquid suspension of a tetravalent mineral oxide. The liquid portion of the suspension can be water, or any other appropriate solvent. The mineral oxide should be in the form of a powder, with a particle size of between about 0.1 to 10 $\mu$m, the particular particle size chosen depending on the desired pore size of the porous particles. This suspension is mixed with one or more pore inducing mineral agents. The suspension optionally also contains one or more binders.

In a typical composition which includes one or more metal oxide or salt binders, the binders are first mixed in a liquid such as water, then the mineral oxide and the pore inducing agent are added while stirring, producing a suspension. The stirring should be gentle, to avoid introducing air bubbles into the mixture.

The amount of pore inducing agent which is used in the initial suspension is roughly proportional to the amount of mineral oxide used. In the final product, the oxide of the tetravalent metal will constitute 50 to 99% of the final particles, with the remaining 1 to 50% made up of pore inducers and optional binders. In the initial suspension, however, the mineral oxide particles, the major constituent of the porous beads, are at a concentration of 10 to 95% by weight, based on the total weight of components used. More preferably, the mineral oxide should be 20–60% by weight. The pore inducing agent concentration is between 5–50% by weight. The optimal concentration varies, depending on the nature of the specific compounds used. The concentration of the agglomeration promoting material (binder) is between 0–20% by weight, and also depends on the nature of the binders. Optionally, organic compounds may also be added to the initial suspension in order to alter the viscosity of the solution.

The suspension containing all the desired components is then used to form beads. A variety of techniques well known in the art, such as spray drying, emulsion-polycondensation and sol-gel processes (as described, for example, in U.S. Pat. No. 5,015,373) can be used to effect the agglomeration of the compositions described in the present invention.

Once the elemental particles are agglomerated into a beaded shape they are heated at high temperature to stabilize the architecture of the porous mineral bead by partial fusion of the elemental particles. The heating rate, the calcination temperature and the soak time used depend on the nature of the mineral oxides and the mineral pore inducers. A controlled sintering is desirable in order to obtain stronger particles without elimination of the porosity. Typically, temperatures between 800 and 1400° C., for a duration of 1 to 10 hours and with a heating rate ranging between 1 to 100° C./hour are used. A sequential calcination treatment can also be used, to first remove volatile components such as water, organic materials, nitrates and the like, then to sinter the elemental particles.

The fired beads are then cooled to room temperature, and subsequently washed with, for example, acidic, alkaline, neutral or diluted hydro-organic solutions. The particles can optionally be subjected to a sieving step to adjust the particle size distribution, as desired.

In another feature of the present invention, the pore inducing agent can also act as a crystal phase stabilizer so as to eliminate the transition from one crystalline structure to another, and the accompanying volume change that would lead to cracking of the product.

Typical pore volumes obtained by such process are between 40 to 70%, and can be between 50 to 70%, of the total bead volume.

These beads can be used as base porous materials for the preparation of sorbents or chromatography beads by introducing within the large pore volume a hydrogel with predetermined properties. The large pore volume obtained with the product and the process of obtaining the mineral beads allows the introduction of large amounts of hydrogel into the particle cores, and therefore the binding capacity of the final sorbent is enhanced.

Organic hydrogels within the beads can be obtained by introducing linear hydrophilic, hydrophobic, or amphiphilic soluble organic polymers, or mixtures thereof, which are then crosslinked in place. Alternatively, the hydrogel filling can be accomplished by introducing solutions of monomers, which are then copolymerized in place. Both routes result in the formation of three-dimensional insoluble hydrogels that fill completely the pore volume of the mineral porous beads.

The linear soluble organic polymers can be natural or synthetic polymers. Suitable natural soluble polymers can include, but are not limited to, polysaccharides, such as agarose, dextran, cellulose, chitosan, glucosaminoglycans and their derivatives. Among synthetic soluble polymers, polyvinyl alcohol, polyethyleneimines, polyvinylamines, polyaminoacids, nucleic acids and their derivatives, for example, are suitable.

The synthetic and/or natural polymers are then crosslinked in place by known chemical and physical means, such as by using chemical bifunctional or polyfunctional crosslinkers such as, but not limited to, bisepoxy reagents, bisaldehydes, and the like.

The pore filling polymers can also comprise hydrophobic or hydrophilic networks obtained by total copolymerization of monomers. The polymeric or copolymeric structures can be obtained under specified conditions. In the case of polymers obtained by copolymerization within the pore volume, the impregnation solution contains monomers from different families such as acrylic monomers, vinyl compounds and allyl monomers or mixtures thereof. Typical monomers include, but are not limited to:

aliphatic ionic, non-ionic and reactive derivatives of acrylic, methacrylic, vinylic and allylic compounds, such as acrylamide, dimethylacrylamide, trisacryl, acrylic acid, acryloylglycine, diethylaminoethylmethacrylamide, vinylpyrrolidone, vinylsulfonic acid, allylamine, allylglycydylether and the like;

aromatic ionic, non-ionic and reactive derivatives of acrylic, methacrylic, vinylic and allylic compounds, such as vinyltoluene, phenylpropylacrylamide, trimethylaminophenylbutylmethacrylate, tritylacrylamide, and the like; and heterocyclic ionic, non-ionic and reactive derivatives of acrylic, methacrylic, vinylic and allylic compounds, such as vinylimidazole, vinylpyrrolidone, acryloylmorpholine, and the like.

Co-monomers for obtaining three-dimensional structures are those containing functional groups such as double bonds that react with other monomers during the process of forming the three-dimensional structure. Typical co-monomers include, but are not limited to:

bisacrylamides, such as N,N'-methylene-bis-acrylamide, N,N'-ethylene-bis-acrylamide, N, N'-hexamethylene-bis-acrylamide, glyoxal-bis-acrylamide, and the like;

bis-methacrylamides, such as N,N'-methylene-bis-methacrylamide, N,N'-ethylene-bis-methacrylamide, N,N'-hexamethylene-bis-methacrylamide, and the like;

bis-acrylates, such as N-diethylmethacrylate, dimethyl-methacrylate and the like;

ethyleneglycol-methacyletes and the like; and diallyltartradiamide.

The combination of these monomers and others confers to the three-dimensional polymer a predetermined property, as desired. Properties which are of interest include ion exchange effects, hydrophobic associations, phase partition, biospecific recognition and intermediate or mixed effects of these properties. Internal hydrogels with molecular sieving properties are also contemplated within the scope of this invention.

The invention is further defined by reference to the following examples, which do not limit the scope of the invention, but are given to illustrate and further support what is described above.

5. EXAMPLES

5.1. Example 1

Preparation of Cerium Stabilized Zirconium Oxide Irregular Particles

A silica sol is prepared by mixing sequentially and progressively 150 mL of sodium silicate 35% with 200 mL of water and 100 mL of glacial acetic acid. 350 g of dry solid irregular zirconia powder (0.3–3 µm size) are dispersed in this suspension. 10 g of cerium oxide and 10 g of cerium nitrate are then added under vigorous stirring. Under the above conditions the gelation process occurs at ambient temperature within 15 to 60 minutes.

After complete gelation (which takes a few hours), the gel is divided into small pieces by press-filtering it through a 200µ sieve. The particles are suspended in clear water and recovered by filtration, washed and then dried at 80° C. under an air stream.

The silica gel that entraps the solid zirconia and ceria composite microparticles is progressively dehydrated. At this point, the particles are soft and show only very modest porosity. Then, the particles are fired at 1300° C. for 2 hours; under these conditions, the silica gel is totally dehydrated and shrinks to such an extent that it forms a continuous layer around the solid sub-particles. The void between subparticles constitutes the macroporosity.

After this treatment the final pore volume represents more than 50% of the whole porous particle volume. The density of the dry irregular particles is about 2.1 g/cm$^3$. After cooling, the beads do not show any cracks due to volume variation of mineral crystalline forms.

5.2. Example 2

Preparation of Cerium Stabilized Zirconium Oxide Beads by Suspension Polycondensation A silica sol is prepared by mixing sequentially and progressively 150 mL of sodium silicate 35% with 200 mL of water and 100 mL of glacial acetic acid. 350 g of dry solid irregular zirconia powder (0.3–3 µm size) are dispersed in this suspension. 10 g of cerium oxide and 10 g of cerium nitrate are then added under vigorous stirring.

The resulting homogeneous suspension is slowly poured in an agitated paraffin oil bath containing 2% sorbitan sesquioleate and dispersed as small droplets. The suspension is heated at 80° C. while stirring. Under these conditions, the gelation process occurs at ambient temperature within 15 to 30 minutes.

The beads of a diameter ranging from 10 to 500 µm comprise a silica hydrogel trapped within its network solid microparticles of pre-formed zirconia and ceria. They are recovered by filtration, washed, and dried at 80° C. under an air stream. The gel is progressively dehydrated and acts as a binder for solid zirconia and ceria composite microparticles. The beads are then fired at 1300° C. for 2 hours, where bead sub-particles are sintered with minimal pore volume reduction. After this treatment, the final void pore volume represents more than 50% of the total bead volume. The density of the dry beads is about 2.1 g/cm$^3$. After cooling, the beads do not show any cracks due to volume variation of mineral crystalline forms.

5.3. Example 3

Preparation of Cerium Stabilized Zirconium Oxide Beads by Spray Drying

A solution is prepared by mixing 190 g of zirconium nitrate and 10 g of cerium nitrate in 300 mL of distilled water. 10 g of cerium oxide and 200 g of zirconia powder (0.3–3 µm) are then added under gentle stirring. Care should be taken to prevent the introduction of air bubbles.

The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The air is typically injected at a temperature of 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms.

This procedure results in the formation of stable beads with a large pore volume that exceeds 50% of the bead volume.

5.4. Example 4

Preparation of Yttrium Stabilized Zirconium Oxide Beads by Spray Drying

A solution is prepared by mixing 231 g of zirconium nitrate and 143.6 g of yttrium nitrate in 1000 mL of distilled water. 144 g of yttrium oxide and 752 g of zirconia powder (0.3–3 $\mu$m size) are then added under gentle stirring to prevent the introduction of air bubbles.

The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The air is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms. This operation results in the formation of stable beads with a large pore volume that exceeds 50% of the bead volume.

5.5 Example 5

Preparation of Scandium Stabilized Zirconium Oxide Beads by Spray Drying

A solution is prepared by mixing 231 g of zirconium nitrate and 150 g of scandium nitrate in 1000 mL of distilled water. 150 g of scandium oxide and 752 g of zirconia powder (0.3–3 $\mu$m size) are then added under gentle stirring to prevent the introduction of air bubbles.

The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The gas is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide-to irreversibly consolidate the network. After cooling, the beads do not show any cracks due to volume variation of mineral crystalline forms. This operation results in the formation of stable beads with a large pore volume that exceeds 50% of the bead volume.

5.6 Example 6

Preparation of Ytterbium Stabilized Zirconium Oxide Beads by Spray Drying Method A solution is prepared by mixing 231 g of zirconium nitrate and 150 g of ytterbium nitrate in 1000 mL of distilled water. 150 g of ytterbium oxide and 752 g of zirconia powder (0.3–3 $\mu$m size) are then added under gentle stirring to prevent the introduction of air bubbles.

The suspension is then injected into a vertical drying chamber through an atomization device, such as a revolving disk, a spray nozzle or an ultrasonic nebulizer, together with a hot gas stream, preferably air or nitrogen. The hot stream causes rapid evaporation of water from the microdroplets. The gas is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms. This operation results in the formation of stable beads with a large pore volume that exceeds 50% of the bead volume.

5.7 Example 7

Preparation of Lanthanum Stabilized Zirconium Oxide Beads by Spray Drying

A solution is prepared by mixing 231 g of zirconium nitrate and 150 g of lanthanum nitrate in 1000 mL of distilled water. 150 g of lanthanum oxide and 752 g of zirconia powder (0.3–3 $\mu$m size) are then added under gentle stirring to prevent the introduction of air bubbles.

The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The gas is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms. This operation results in the formation of stable beads with a large pore volume that exceeds 50% of the bead volume.

5.8 Example 8

Preparation of Yttrium Stabilized Titanium Oxide Beads by Spray Drying

A solution is prepared by mixing 231 g of titanium nitrate and 150 g of yttrium nitrate in 1000 mL of distilled water. 150 g of yttrium oxide and 752 g of titania powder (0.3–3 $\mu$m size) are then added under gentle stirring to prevent the introduction of air bubbles.

The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The gas is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms.

This operation results in the formation of stable beads with a large pore volume that exceeds 50% of the bead volume.

5.9 Example 9

Preparation of Cerium Stabilized Titanium Oxide Beads by Spray Drying

A solution is prepared by mixing 231 g of titanium a nitrate and 150 g of cerium nitrate in 1000 mL of distilled water. 150 g of cerium oxide and 752 g of titania powder (0.3–3 µm size) are then added under gentle stirring to prevent the introduction of air bubbles. The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The gas is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the titanium oxide to irreversibly consolidate the network. This operation results in the formation of stable beads with a large pore volume that exceeds 50% of the bead volume.

5.10 Example 10

Preparation of Yttrium Stabilized Hafnium Oxide Beads by Spray Drying

A solution is prepared by mixing 231 g of hafnium nitrate and 150 g of yttrium nitrate in 1000 mL of distilled water. 150 g of yttrium oxide and 752 g of hafnia powder (0.3–3 µm size) are then added under gentle stirring to prevent the introduction of air bubbles. The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The gas is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the hafnia to irreversibly consolidate the network. After cooling, the beads do not show any cracks due to volume variation of mineral crystalline forms. This operation results in the formation of stable beads with a large pore volume that exceeds 50% of the bead volume.

5.11 Example 11

Preparation of Cerium Stabilized Hafnium Oxide Beads by Spray Drying

A solution is prepared by mixing 231 g of hafnium nitrate and 150 g of cerium nitrate in 1000 mL of distilled water. 150 g of cerium oxide and 752 g of hafnia powder (0.3–3 µm size) are then added under gentle stirring to prevent the introduction of air bubbles. The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The gas is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the hafnia to irreversibly consolidate the network. After cooling, the beads do not show any cracks due to volume variation of mineral crystalline forms. This operation results in the formation of stable beads with a large pore volume that exceeds 50% of the bead volume.

5.12 Example 12

Preparation of Zirconia Beads Stabilized by a Cerium and Yttrium Mixture by Spray Drying A solution is prepared by mixing 231 g of zirconium nitrate, 75 g of yttrium nitrate and 75 g of cerium nitrate in 1000 mL of distilled water. 75 g of cerium oxide, 75 g of yttrium oxide and 752 g of zirconia powder (0.3–3 µm size) are then added under gentle stirring to prevent the introduction of air bubbles.

The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The air is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms. This operation results in the formation of stable beads with a large pore volume that exceeds 50% of the bead volume.

5.13 Example 13

Preparation of Zirconia-Hafnia Beads Stabilized by Yttrium by Spray Drying

A solution is prepared by mixing 231 g of zirconium nitrate and 150 g of yttrium nitrate in 1000 mL of distilled water. 75 g of yttrium oxide, 75 g of hafnium oxide and 677 g of zirconia powder (0.3–3 µm size) are then added under gentle stirring to prevent the introduction of air bubbles. The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The air is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms. This operation results in the formation of stable beads with a large pore volume that exceeds 50% of the bead volume.

5.14 Example 14

Modulation of Pore Volume by Varying the Amount of Pore Inducing Agent in Zirconia Beads Four solutions containing 0 (control), 7, 8.9 and 20 weight percent of equivalent yttrium oxide are prepared by the following method. The values for A, B, C and D discussed below are set forth in Table 1 for each of the four solutions.

A g of zirconium nitrate and B g of yttrium nitrate are dissolved in 1000 mL of distilled water. C g of yttrium oxide and D g of zirconia powder (0.3–3 µm size) are then added under gentle stirring to prevent the introduction of air bubbles.

TABLE 1

|  | Weight Percent $Y_2O_3$ | | | |
| --- | --- | --- | --- | --- |
|  | 0%[a] | 7.0% | 8.9% | 20% |
| A: $Zr(NO_3)_4$ (g) | 45.05 | 45.05 | 45.05 | 45.05 |
| B: $Y(NO_3)_3$ (g) | 0 | 15 | 20 | 55.8 |
| C: $Y_2O_3$ (g) | 0 | 45 | 58 | 143.6 |
| D: $ZrO_2$ powder (g) | 752 | 752 | 752 | 752 |

[a]Control Sample

The suspension is then injected into a vertical drying chamber through an atomization device, such as a revolving disk, a spray nozzle or an ultrasonic nebulizer, together with a hot gas stream, preferably air or nitrogen. The hot gas stream causes rapid evaporation of water from the microdroplets. The air is typically injected at 300–350° C. and exits the dryer at a temperature slightly above 100° C. Microparticles of original mineral oxides are consolidated into individual aggregates of spherical shape. Dry microbeads are then fired at a temperature close to the melting temperature of the zirconium oxide to irreversibly consolidate the network. After cooling, the beads do not show any cracks due to volume variation of mineral crystalline forms, except for the control.

Trials with pore inducing yttrium oxide result in the formation of stable beads, the pore volume of which depends on the amount of pore inducer, in this case yttrium oxide. Table 2 depicts the influence of yttrium oxide concentration on the pore volume of the resulting zirconium oxide beads.

TABLE 2

| Characteristics | Weight Percent $Y_2O_3$ | | | |
| --- | --- | --- | --- | --- |
| of Fine Beads | 0%[a] | 7.0% | 8.9% | 20% |
| Pore Volume (%) | 40 | 48 | 50.5 | 57 |
| Particle Size (µm) | 54 | 51.2 | 56 | 53 |
| Surface Area ($m^2/g$) | 5.9 | 8 | 7.5 | 6 |
| Pore Size (Å) | 2500 | 2400 | 2800 | 2600 |

[a]Control Sample

5.15 Example 15

Pore Filling with Dextran Gel of Cerium Stabilized Zirconia Beads

Cerium stabilized zirconium oxide beads (obtained as described in Example 3) of a diameter ranging from 10 to 100 µm and a pore volume of about 60% of the total bead volume, are impregnated with an aqueous solution of 10% dextran (10,000 molecular weight). Dextran was previously dissolved in a 0.2 M sodium carbonate solution containing sufficient sodium hydroxide to reach a pH of 11.5. The solution also contained 1% butanedioldiglycidylether and 0.1% sodium borohydride. The amount of dextran solution is calculated to correspond to the total pore volume of the beads to impregnate.

The impregnated beads are transferred into a closed vessel and heated at 85° C. overnight. Under these conditions, the dextran solution is crosslinked in place within the porous mineral network.

These beads contain about 6% sugars and can be used as in classical chromatography media synthesis for the attachment of ion exchange, hydrophobic as well as affinity chemical groups.

5.16 Example 16

Pore Filling with Agarose Gel of Yttrium Stabilized Titania Beads

An agarose solution is obtained by dispersing 4 g of agarose powder in hot water under vigorous stirring. A clear solution is obtained by heating the agarose solution in a boiling bath for a few dozen minutes. Such a solution forms a reversible strong gel when cooled below 40° C. Mineral oxide beads, obtained as per Example 8, are heated at about 150° C. in a closed vessel, and impregnated with a volume of hot agarose solution that corresponds to the total bead pore volume. The mixture is kept at 80–120° C. for 1–2 hours and progressively cooled down to room temperature. Agarose solution inside the pore volume of the microbeads is gelified and forms an organic network ideal for the preparation of a large variety of derivatives for liquid chromatography using classically described chemical reactions.

5.17 Example 17

Pore Filling of Zirconia Stabilized Beads with Synthetic Cationic Hydrogel 3 g of dimethylacrylamide are dissolved in 50 mL of dimethylsulfoxide. 0.5 gram of N,N'-methylene-bis-methacrylamide and 10 g of methacryl amidopropyltrimethyl ammonium chloride are then added while stirring. The volume of the monomer solution is adjusted to 100 mL with distilled water and the solution is mixed thoroughly. 0.2 g of a polymerization initiator such as azo-bis-amidino-propane are added. This monomer solution is mixed with a given amount of yttria stabilized zirconia particles, obtained as per Example 3, that corresponds to a pore volume of 100 mL. The suspension is mixed thoroughly for 15–30 minutes to have all of the monomer solution absorbed by the porous beads, and put into a closed vessel. The mixture is then heated for four hours at 70–90° C. in order to initiate and complete the polymerization. At the end of the polymerization reaction, the resulting solid phase ion exchanger is washed thoroughly and used for protein separation by liquid chromatography. The number of quaternary amino groups per mL of sorbent is about 125 µmoles and the binding capacity for bovine serum albumin in classical conditions of ionic strength and pH is 85 mg/mL.

5.18 Example 18

Pore Filling of Zirconia Stabilized Beads with Synthetic Anionic Hydrogel 2 g of dimethylacrylamide are dissolved in 50 mL of dimethylsulfoxide. 0.5 gram of N,N'-methylene-bis-methacrylamide and 10 g acrylamidomethylpropane sulfonic acid sodium salt are then added while stirring. The volume of the monomer solution is adjusted to 100 mL with distilled water and the solution is mixed thoroughly. 0.2 g of a polymerization initiator such as azo-bis-amidino-propane are added. This monomer solution is mixed with a given amount of yttria stabilized zirconia particles, obtained as per Example 3, that corresponds to a pore volume of 100 mL. The suspension is mixed thoroughly for 15–30 minutes to have all the monomer solution absorbed by the porous beads and put into a closed vessel. The mixture is then heated for four hours at 70–90° C. in order to initiate and complete the polymerization. At the end of the polymerization reaction the resulting solid phase ion exchanger is washed thoroughly and used for protein separation by liquid chromatography. The number of sulfonic groups per mL of sorbent is 170 about $\mu$moles and the binding capacity for egg lysozyme in classical conditions of ionic strength and pH is 95 mg/mL.

5.19 Example 19

Pore Filling of Yttrium Stabilized Hafnia Beads with Synthetic Anionic Hydrogel The preparation of such an ion exchanger using yttrium stabilized hafnium oxide prepared according to Example 10 is made using the same procedure as described for yttria stabilized zirconia beads in Example 18. The final ion exchanger obtained shows a number of quaternary amino groups of about 160 $\mu$moles per mL of sorbent and a binding capacity for egg lysozyme of about 110 mg per mL of sorbent.

5.20 Example 20

Pore Filling of Cerium Stabilized Titania-Hafnia Beads with Synthetic Cationic Hydrogel The preparation of such an ion exchanger using cerium stabilized titanium oxide prepared according to Example 9 is made using the same procedure as described for yttria stabilized zirconia beads in Example 17. The final ion exchanger obtained show a number of sulfonic groups of about 110 $\mu$moles per mL of sorbent and a binding capacity for cytochrome c of about 90 mg per mL of sorbent.

5.21 Example 21

Pore Filling of Yttrium Stabilized Zirconia Beads with Synthetic Non-ionic Hydrophilic Gel 12 g of N-tris-hydroxymethylmethylmethacrylamide are dissolved in 50 mL of dimethylsulfoxide. 0.5 gram of N,N'-methylene-bis-methacrylamide and 10 g of methacryl amidopropyltrimethyl ammonium chloride are then added while stirring. The volume of the monomer solution is adjusted to 100 mL with distilled water and the solution is mixed thoroughly. 0.2 gram of a polymerization initiator such as azo-bis-amidino-propane are added. This monomer solution is mixed with a given amount of yttria stabilized zirconia particles, obtained as per Example 3, that corresponds to a pore volume of 100 mL. The suspension is mixed thoroughly for 15–30 minutes to have all the monomer solution absorbed by the porous beads, and put into a closed vessel. The mixture is then heated for four hours at 70–90° C. in order to initiate and complete the polymerization. At the end of the polymerization reaction the resulting material is washed thoroughly and may be used either for protein separation by molecular sieving or as starting material to make chemical derivatives on the polymer moiety for immobilization of various chemical ligands.

5.22 Example 22

Preparation of Preactivated Synthetic Hydrogel Filled Zirconia Beads for Affinity Chromatography Composite material obtained according to Example 21 is chemically modified to introduce primary amino groups as, for example, by aminolysis using ethylenediamine in dry conditions and at 80° C. for 10 hours. 100 mL of washed dry resulting material containing primary amino groups is suspended in pure methanol containing 4 g of diethylester squaric acid. The suspension is shaken for 2 hours and then washed extensively with methanol. The final product thus obtained is a solid phase containing chemically activated groups that can be reacted with primary amino-containing molecules, such as amino acids or proteins, for chemical immobilization and use in affinity chromatography.

5.23 Example 23

Preparation of Preactivated Polysaccharide Filled Stabilized Titania Beads for Affinity Chromatography 10 mL of composite material obtained according to Example 16 is first washed repeatedly with dry dioxane until elimination of water and drained under vacuum. The drained cake is suspended in 25 mL of pure dioxane in which 1 g of carbonyldiimidazole (CDI) is dissolved. The mixture is shaken for 4 hours at room temperature and then washed extensively with dioxane to eliminate excess reagents. CDI-activated material is stored in dry form and can be used for the immobilization of amino-containing molecules such as amino acids and proteins.

5.24 Example 24

Immobilization of Antibodies on Chemically Activated Gel Filled Zirconia Stabilized Beads 10 mL of the material from Example 22 is drained under vacuum so as to eliminate any trace of solvent or stabilizing agent and suspended in a 0.2 M borate buffer (pH 9) containing 100 mg of pure rabbit anti human IgG. The suspension is shaken overnight at room temperature and then washed extensively with borate buffer and then with a phosphate buffered saline (PBS) solution. The amount of antibodies immobilized by this way is 6 mg per mL of activated sorbent. The resin is used for the separation of human IgG by chromatography. The solid immunosorbent is introduced into a chromatographic column equilibrated with a physiological buffer (e.g. PBS) and loaded with human serum until saturation. The column is then extensively washed with PBS to eliminate excess proteins and IgG desorbed using 0.2 M glycine-HCl buffer (pH 2.8). Collected antibodies are then immediately neutralized and analyzed by electrophoresis. The binding capacity of the column for human IgG is about 2.5 mg per mL.

5.25 Example 25

Immobilization of Protein A on Chemically Activated Agarose Filled Titania Stabilized Beads for the Capture of Antibodies 10 mL of dry material from Example 23 is suspended in a 0.2 M carbonate buffer (pH 10.5) containing 80 mg of pure recombinant Protein A. The suspension is shaken overnight at room temperature and then washed extensively with carbonate buffer and then with a phosphate buffered saline (PBS) solution. The amount of Protein A immobilized is 3 mg per mL of activated sorbent. The resin is used for the separation of rabbit IgG by chromatography. The solid affinity sorbent is introduced into a chromatographic column equilibrated with a physiological buffer (e.g. PBS) and loaded with rabbit serum until saturation. The column is then extensively washed with PBS to eliminate proteins in excess and IgG desorbed using 0.5 M acetic acid. Collected IgG are then immediately neutralized and analyzed by electrophoresis. The binding capacity of the column for human IgG is about 12 mg per mL.

5.26 Example 26

Preparation of Gel Filled Stabilized Mineral Oxides of Different Densities and Their Use for Fluid Bed Adsorption Stabilized mineral oxides from Examples 3, 8 and 10 (yttrium stabilized titania, zirconia and hafnia) have apparent densities in water of 2.8, 3.5 and 5.3 g/cm$^3$, respectively. 50 mL of each material is sieved between 50 and 100 μm, and introduced in fluid bed columns of 25 mm diameter and subjected to an upward water flow. All beads have a pore volume per mL of sorbent of about 0.5 mL. The water flow is the same for each column. As seen in Table 3, different upward flows are used to measure the bed expansion according to the nature and the density of the mineral beads.

TABLE 3

|  | Expansion Factor$^a$ | | |
| --- | --- | --- | --- |
| Upward Flow Rate | Titania (2.8 g/cm$^3$)$^b$ | Zirconia (3.5 g/cm$^3$)$^b$ | Hafnia (5.3 g/cm$^3$)$^b$ |
| 300 cm/hr | 1.8 | 1.7 | 1.4 |
| 600 cm/hr | 2.7 | 4.2 | 1.8 |
| 1200 cm/hr | 5.8 | 4.2 | 2.7 |
| 2400 cm/hr | (c) | (c) | 5.5 |

$^a$Ratio of expanded bed height to packed bed height.
$^b$Apparent density.
$^c$Elutriation.

There is a correlation between the density of the initial material and the bed expansion, whatever the flow rate. An expansion factor of 2 requires an upward flow of about 321, 439 and 780 cm/hr for stabilized titania, zirconia and hafnia porous beads, respectively.

It may be apparent to those skilled in the art that modifications and variations of the present invention are possible in light of the above disclosure. It is understood that such modifications are within the spirit and scope of the invention, which is limited and defined only by the appended claims.

What is claimed is:

1. Mineral oxide beads comprising at least one oxide of a tetravalent metal and at least one oxide of a trivalent metal, wherein the beads have a pore volume which exceeds 40% of the bead volume and have a pore diameter between 600 and 3000 Å.

2. The mineral oxide beads according to claim 1 wherein the pore volume exceeds 50% of the bead volume.

3. The mineral oxide beads according to claim 1 wherein the tetravalent metal oxide is titania, zirconia or hafnia.

4. The mineral oxide beads according to claim 1, wherein said oxide of trivalent metal is an oxide of aluminum, gallium, indium, scandium, yttrium, lanthanum, actinium, or a rare earth metal.

5. The mineral oxide beads according to claim 1 wherein the pore volume contains a hydrogel polymer.

6. The mineral oxide beads according to claim 5 wherein the hydrogel polymer is an organic hydrogel comprising a linear soluble organic polymer or a mixture of linear soluble organic polymers crosslinked in place.

7. The mineral oxide beads according to claim 6 wherein the linear soluble organic polymer is a polysaccharide or a mixture of polysaccharides.

8. The mineral oxide beads according to claim 7 wherein the polysaccharide is agarose, dextran, cellulose, chitosan, a glucosaminoglycan, or derivatives thereof.

9. The mineral oxide beads according to claim 6 wherein the linear soluble organic polymer is polyvinyl alcohol, a polyethyleneimine, a polyvinylamine, a polyaminoacid, a nucleic acid, or derivatives thereof.

10. The mineral oxide beads according to claim 5 wherein the hydrogel polymer is an organic hydrogel comprising pore filling monomers, comonomers, or combinations thereof, copolymerized in place.

11. The mineral oxide beads according to claim 10 wherein the monomers are selected from the group consisting of:

(a) aliphatic ionic, non-ionic and reactive derivatives of acrylic, methacrylic, vinylic and allylic compounds;

(b) aromatic ionic, non-ionic and reactive derivatives of acrylic, methacrylic, vinylic and allylic compounds;

(c) heterocyclic ionic, non-ionic and reactive derivatives of acrylic, methacrylic, vinylic and allylic compounds; and mixtures thereof.

12. The mineral oxide beads according to claim 11 wherein (a) is acrylamide, dimethylacrylamide, trisacryl, acrylic acid, acryloylglycine, diethylaminoethyl methacrylamide, vinylpyrrolidone, vinylsulfonic acid, allylamine, allylglycydylether or derivatives thereof.

13. The mineral oxide beads according to claim 11 wherein (b) is vinyltoluene, phenylpropylacrylamide, trimethylaminophenylbutylmethacrylate, tritylacrylamide or derivatives thereof.

14. The mineral oxide beads according to claim 11 wherein (c) is vinylimidazole, vinylpyrrolidone, acryloylmorpholine or derivatives thereof.

15. The mineral oxide beads according to claim 10 wherein the co-monomers are selected from the group consisting of:

(a) bisacrylamides;
(b) bis-methacrylamides;
(c) bis-acrylates;
(d) ethyleneglycol-methacrylates or dimethacrylates; and
(e) diallyltartradiamide.

16. The mineral oxide beads according to claim 15 wherein (a) is N,N'-methylene-bis-acrylamide, N,N'-ethylene-bis-acrylamide, N,N'-hexamethylene-bis-acrylamide or glyoxal-bis-acrylamide.

17. The mineral oxide beads according to claim 15 wherein (b) is N,N'-methylene-bis-methacrylamide, N,N'-ethylene-bis-methacrylamide or N, N'-hexamethylene-bis-methacrylamide.

18. The mineral oxide beads according to claim 15 wherein (c) is N-diethylmethacrylate or dimethylmethacrylate.

19. A method of separating materials by liquid chromatography fluidized bed adsorption comprising passing said materials through a chromatographic column packed with a chromatographic support comprising the mineral oxide beads of claim 5.

20. The method of claim 19 wherein the materials include biological molecules.

21. The mineral oxide beads according to claim 5, wherein the pores are completely filled with the hydrogel polymer.

22. A method of making hydrogel-filled mineral oxide beads with a pore volume of at least 40% and a pore diameter between 600 and 3000 Å according to claim 5, comprising:

preparing a mixture of at least one mineral oxide of a tetravalent metal and at least one oxide or a salt of a trivalent metal, forming sintered beads from said mixture, and filling the poles in said beads with an organic hydrogel polymer comprising:
(a) a linear soluble organic polymer or a mixture of linear soluble organic polymers crosslinked in place; or
(b) pore filling monomers and comonomers copolymerized in place,
wherein said organic hydrogel polymer completely fills the pore volume.

23. The method of claim 22, wherein the mixture comprises 10 to 90% by weight of tetravalent mineral oxide, 5 to 50% of an oxide or salt of a trivalent metal, and 5 to 50% binder.

24. The method of claim 23, wherein the method further comprises sintering the beads at a temperature of about 800 to about 1400° C.

25. A method of making mineral oxide beads according to claim 1, which comprises:
preparing a mixture of at least one mineral oxide of a tetravalent metal and at least one oxide or a salt of a trivalent metal, and
forming beads from the mixture in which pore volume exceeds 40% and pore diameter is between 600 and 3000 Å.

26. The method according to claim 25 therein the mineral oxide of a tetravalent metal is selected from the group consisting of titania, zirconia and hafnia.

27. The method according to claim 25 wherein the trivalent metal is selected from the group consisting of aluminum, gallium, indium, scandium, yttrium, lanthanum, actinium, and a rare earth metal.

28. The method according to claim 27 wherein the rare earth metal is cerium, neodymium, erbium or ytterbium.

29. The method according to claim 25 wherein the salt is nitrate.

30. The method according to claim 25, wherein the oxide or salt of the trivalent metal in the mixture of tetravalent mineral oxides comprises 5 to 50% by weight, based on the total weight of metal containing components.

31. The method according to claim 25 wherein the mixture further comprises at least one binder.

32. The method according to claim 31 wherein the binder is selected from the group consisting of salts of trivalent metals, salts of tetravalent metals, and materials which form mineral hydrogels.

33. The method according to claim 32 wherein the binder comprises a nitrate salt of titanium, zirconium or hafnium.

34. The method according to claim 33 wherein the binder further comprises a nitrate salt of aluminum, gallium, indium, scandium, yttrium, lanthanum, cerium, neodymium, erbium, ytterbium or actinium.

35. The method of claim 31 wherein the mixture comprises 10 to 90% by weight of tetravalent mineral oxide, 5 to 50% oxide or salt of trivalent metal, and 5 to 50% binder.

36. The method of claim 25 wherein the mineral oxide of a tetravalent metal is provided as a powder.

37. The method of claim 36 wherein the mineral oxide powder has a particle size of 0.1 to 10 µm.

38. The method of claim 37 wherein the beads are formed by a spray drying process, a sol-gel process or an emulsion-polycondensation process.

39. The method of claim 25 wherein the method further comprises sintering the beads.

40. The method of claim 39 wherein the beads are sintered at a temperature of about 800° to about 1400° C.

41. The method according to claim 25, wherein the trivalent metal is cerium neodymium, erbium or ytterbium.

42. The method according to claim 25, wherein said mixture comprises a nitrate salt of said trivalent metal.

43. Mineral oxide beads according to claim 1, said mineral oxide beads containing an organic hydrogel polymer comprising:
(a) a linear soluble organic polymer or a mixture of linear soluble organic polymers crosslinked in place; or
(b) pore filling monomers and comonomers copolymerized in place,
wherein the organic hydrogel polymer of (a) or (b) completely fills the pore volume.

44. The mineral oxide beads according to claim 43 wherein the hydrogel polymer is a polysaccharide or a mixture of polysaccharides.

45. The mineral oxide beads according to claim 44, wherein the poly saccharide is agarose, dextran, cellulose, chitosan, glucosaminoglycan, or a derivative thereof.

46. The mineral oxide beads according to claim 43, wherein said hydrogel polymer is polyvinyl alcohol, polyethyleneimine, a polyvinylamine, a polyaminoacid, a polynucleic acid, or a derivative thereof.

47. The mineral oxide beads according to claim 43, wherein said hydrogel polymer comprises pore-filling monomers, comonomers or combinations thereof, copolymerized in place.

48. The mineral oxide beads according to claim 47, wherein the monomers selected from the group consisting of;
(a) aliphalic ionic, non-ionic and reactive derivatives of acrylic, methacrylic, vinylic and allylic compounds;
(b) aromatic ionic, non-ionic and reactive derivatives of acrylic, methacrylic, vinylic and allylic compounds;
(c) heterocyclic ionic, non-ionic and reactive derivatives of acrylic, mechacrylic, vinylic and allylic compounds;
and mixtures thereof.

49. The mineral oxide beads according to claim 48, wherein the monomers are acrylamide, dimethylacrylamide, trisacryl, acrylic acid, acryloylglycine, diethylaminoethyl methacrylamide, vinylpyrrolidone, vinylsulfonic acid, allylamine, allylgycydylether or a derivative thereof.

50. The mineral oxide beads according to claim 47, wherein the monomers are vinyl toluene, phenylpropylacrylamide, trimethylaminophenylbutylmethacrylate, tritylacrylamide or a derivative thereof.

51. The mineral oxide beads according to claim 47, wherein the monomers are vinylimidazole, vinylpyrrolidone, acryloylmorpholine or a derivative thereof.

52. The mineral beads to claim 47, wherein the comonomers are selected from the group consisting of bisacrylamides, bis-methacrylamides, bis-acrylates, ethyleneglycol-methacrylates, diethyleneglycol-methacrylates, and diallyltartradiamide.

53. The mineral oxide beads according to claim 52, wherein the monomers are selected from the group consisting of N,N'-methylene-bis-acrylamide, N,N'-ethylene-bis-acrylamide, N,N'-hexamethylene-bis-acrylamide, or glyoxal-bis-acrylamide.

54. The mineral oxide beads according to claim 52, wherein the comonomers are selected from the group consisting of N-diethylmethacrylate and dimethylmethacrylate.

55. A method of separating materials by liquid chromatography fluidized bed absorption comprising passing said materials through a chromatographic column packed with a chromatographic support comprising the mineral oxide beads of claim 43.

56. The method of claim 55, wherein materials include biological molecules.

57. A method of making mineral oxide beads of claim 1, which comprises:

preparing a mixture comprising:
- (a) a mineral oxide powder of a tetravalent metal selected from the group consisting of zirconium, titanium and hafnium, said powder having a particle size of 0.1 to 10 $\mu$m;
- (b) an oxide of a trivalent metal selected from the group consisting of aluminum, gallium, indium, scandium, yttrium, lanthanum, actinium, cerium, neodymium, erbium and ytterbium;
- (c) a nitrate of a trivalent metal selected from the group consisting of aluminum, gallium, indium, scandium, yttrium, lanthanum, actinium, cerium, neodymium, erbium and ytterbium; and
- (d) a nitrate of a tetravalent metal selected from the group consisting of zirconium, titanium and hafnium;

wherein (a) comprises 40 to 60% by weight of said mixture, (b) and (c) together comprise 20 to 40% by weight of said mixture, and (d) comprises 10 to 20% by weight of said mixture;

forming beads from said mixture by a spray drying process, a sol-gel process or an emulsion-polycondensation process; and sintering said beads at a temperature of about 800° C. to 1400° C.

58. A method of separating a mixture of biological molecules by liquid chromatography comprising passing said mixture through a chromatographic column packed with a chromatographic support comprising mineral oxide beads according to claim 1, said mineral oxide beads containing an organic hydrogel polymer comprising:

- (a) a linear soluble organic polymer or a mixture of linear soluble organic polymers crosslinked in place; or
- (b) pore filling monomers and comonomers copolymerized in place.

59. The method according to claim 58, wherein said mineral oxide beads comprise zirconia, hafnia, titania or a mixture thereof.

60. A method of separating materials by liquid chromatography fluidized bed adsorption comprising passing said materials through a chromatographic column packed with a chromatographic support comprising the mineral oxide beads of claim 1.

61. The method of claim 60 wherein the materials include biological molecules.

* * * * *